United States Patent [19]

Frutin et al.

[11] Patent Number: 5,032,619

[45] Date of Patent: Jul. 16, 1991

[54] GAS STORAGE AND DISPENSING SYSTEMS

[75] Inventors: Bernard D. Frutin, Strathclyde; Peter G. Perkins, Glasgow, both of Great Britain

[73] Assignee: Rocep-Lusol Holdings Limited, Renfrew, Great Britain

[21] Appl. No.: 487,588

[22] Filed: Mar. 2, 1990

[30] Foreign Application Priority Data

Mar. 2, 1989 [GB] United Kingdom ................. 8904775

Jun. 7, 1989 [GB] United Kingdom ................. 8913051

[51] Int. Cl.[5] ................................................ C08G 18/14

[52] U.S. Cl. .................................. 521/55; 222/386.5; 222/389; 222/394; 222/399; 222/402.1

[58] Field of Search ............... 521/55; 222/386.5, 389, 222/394, 399, 402.1

[56] References Cited

U.S. PATENT DOCUMENTS 4,940,170 7/1990 Popp-Ginsbach .............. 222/402.1

*Primary Examiner*—Maurice J. Welsh

*Attorney, Agent, or Firm*—Ratner & Prestia

[57] ABSTRACT

Systems for storing and dispensing gases. The gas storage systems are two-phase gas/solid or gas/liquid, or three-phase gas/liquid/solid, functioning by reversible sorption. In gas storage systems having a solid phase, use is made of a polymeric material, preferably a hydrogel, having microvoids functioning as interstitial stores for gas. Reversible gas sorption in the microporous polymer is improved by treatment with a swelling promoter. The stored gas may be a propellant, and reversible sorption propellant storage may be used in all types of pressure pack dispenser. Cryogenic techniques facilitate preparation of propellant systems with standardized parameters. The invention enables use of safe and environmentally benign gases as propellants.

29 Claims, 1 Drawing Sheet

GAS STORAGE AND DISPENSING SYSTEMS

This invention relates to gas storage and dispensing systems.

BACKGROUND OF THE INVENTION

There are innumerable situations in which a gas requires to be stored for subsequent release under substantially controlled conditions for practical use to be made of the physical and/or chemical properties of the gas. By way of example, stored and released gas may be employed for pressurised dispensing of a substance from a container using the gas as a propellant.

Pressure pack dispensers (commonly but often incorrectly referred to as "aerosol" containers) are employed to dispense a very large number of different substances (hereinafter termed the "product") having a wide range of physical and chemical properties, notably in respect of consistency and viscosity. A pressure pack dispenser is often generally cylindrical usually being fabricated as a sheet metal can, and has a manually-operable valve to control the flow of product from the dispenser. The outflowing product is propelled by a propellant gas stored under pressure in the pressure pack dispenser, the propellant gas being placed in the dispenser at about the same time as the dispenser is loaded with the product to be dispensed. The propellant gas may be unseparated from the product by any mechanical barrier, or the propellant gas may be separated from the product by a barrier which prevents the passage of propellant gas into the produot while simultaneously more or less freely transmitting propellant gas pressure to the product; such a barrier may comprise a flexible impermeable sheet which may be in the form of a bag or alternatively the barrier may comprise a piston slidable within the (conveniently) cylindrical dispenser, for example as described in European Patent Specification EP0089971.

A number of practical considerations limit the substances which can be used as propellant gases and/or the circumstances in which a given substance can be used as a propellant gas. By way of non-limiting examples, such considerations include the ability to sustain pressure within acceptable limits during use, safety factors which include flammability and toxicity of the propellant, and chemical reactivity of the propellant with the container and, mainly in the case of non-barrier dispensers, reactivity of the propellant with the product to be dispensed. By way of a non-limiting example of the circumstances affecting use of a substance as a propellant gas in a non-barrier dispenser, the substance may be substantially inert with respect to one product but react unfavourably with another product (unless isolated by a barrier).

For many years the substances collectively known as CFC's (chlorofluorocarbons) were popular for use as propellants in pressure pack dispensers owing to favourfable pressure characteristics combined with non-flammability and apparent non-toxicity, but CFC's are now perceived as extreme environmental hazards and are the subject of international sanctions; CFC's are no longer acceptable as propellant substances in pressure pack dispensers. Although some readily available gases are free of hazards and are substantially unreactive (for example, nitrogen), gases per se are generally unsuitable for use as propellants in pressure pack dispensers because of unacceptably rapid fall-off of propellant pressure during use of the pressure pack dispenser. Elaborations of construction and use may reduce the unwanted effects of these adverse pressure characteristics, but at the expense of increased complexity and cost, and possibly an increased hazard arising from increased initial internal pressure in the pressure pack dispenser.

Two-phase gas/liquid pressure pack propellant systems may give more acceptable pressure characteristics in terms of an acceptably low fall-off of propellant pressure during use of the pressure pack dispenser, in comparison to a single-phase gas-only system, where the liquid in a two-phase gas/liquid pressure pack propellant system is a pressure-liquefied form of the propellant gas. However the requisite pressure at ambient temperature may be unacceptably high in the context of conventional pressure pack dispensers; additional or alternative disadvantages of two-phase gas/liquefied-gas propellant systems are that they tend to employ gases which are flammable and potential substances of abuse, such as propane, butane and propane/butane mixtures. (It should be noted that such two-phase gas/liquefied gas propellant systems are essentially single-material propellant systems, where the single propellant material is present in both gas and liquid phases; this 'single material' nature is not altered by the propellant being a mixture such as butane and propane, since the components of such mixtures change phase together, and a chemically distinct liquid is not present in such systems.)

A further consideration is that even in the case of a pressure pack dispenser with a theoretically perfect barrier such that the propellant gas is supposedly perfectly isolated from the user of the pressure pack dispenser and from the immediate environment at the time of use of the dispenser, unless strict precautions are taken over the ultimate disposal of the spent dispenser (if necessary, with rigorous decontamination), the dispenser will eventually release its contents through corrosion or mechanical damage, hence admitting the propellant to the environment. For this reason, barrier-type pressure packs are not an acceptable solution to long-term environmental problems.

To summarize the main considerations for the adoption of a given propellant system in a pressure pack dispenser, the propellant system should be:

(a) free of toxicity over any length of time and in any feasible concentration;

(b) free of environmental hazard over any length of time;

(c) free of other hazards, including but not restricted to hazards of fire and explosion;

(d) maintain adequate dispensing pressure on the product throughout use of the pressure pack dispenser, without excessive pressure at any time;

(e) at least in non-barrier dispensers, be compatible, and preferably non-reactive, with the product to be dispensed; and (f) be reasonably economic.

The above list of desiderata for a propellant system is only a general indication and is in no way definitive to the exclusion of any other factors; further, the desiderata are not mutually exclusive in the sense that a characteristic of a selected propellant may satisfy two or more desiderata simultaneously (for example, a hypothetical inert substance may be both non-toxic and non-flammable, as in the case of nitrogen).

SUMMARY OF THE INVENTION

The present invention arises from the surprising discovery that certain types of material, either alone or in combination with one or more other materials, can act as a non-gaseous phase to hold a propellant gas (or gas mixture) in a propellant system which can readily satisfy most or all of the above-listed principal desiderata.

According to a first aspect of the present invention there is provided a gas storage and dispensing system for the substantially reversible storage of a gas, said gas storage and dispensing system comprising a polymeric material having molecular microvoids occupiable by the gas to cause the polymeric material to form a two-phase gas/solid reversible sorption gas storage system which will tend to sorb increasing quantities of gas in increasing ambient gas pressure, and tend to desorb previously sorbed gas with decreases in ambient gas pressure.

According to a second aspect of the present invention there is provided a gas storage and dispensing system for the substantially reversible storage of a gas, said gas storage and dispensing system comprising a polymeric material having molecular microvoids occupied by a liquid which is a solvent of the gas but which is insoluble of the polymeric material, such occupation of the microvoids by the liquid with the gas dissolved therein causing the polymeric material to form a three-phase gas/liquid/solid reversible sorption gas storage system which will tend to sorb increasing quantities of gas in increasing ambient gas pressure, and tend to desorb previously sorbed gas with decreases in ambient gas pressure.

In both the first and second aspects of the invention, the polymeric material is a "solid" phase in the sense that the polymeric material is neither gaseous nor liquid on a microscopic scale, though the polymeric material will in general be a non-rigid solid, preferably with substantially elastic mechanical properties, and the total mass of polymeric material involved in any given gas storage system may be mechanically subdivided into a substantial plurality of fragments, which may ultimately be in fine particulate form having fluent liquid-like properties on a macroscopic scale but without becoming liquid per se. Without prejudice to the generality of the definitions of the present invention, it is believed that the microvoids in the polymeric material function as interstitial stores on a molecular or near-molecular scale for the gas (in the two-phase gas/solid system) or for the liquid solvent of the gas (in the three-phase gas/liquid/solid system) as the case may be, such that the polymeric material functions as a form of "sponge" which directly or indirectly holds the gas in the solid phase constituted by the polymeric material. The analogy to a sponge is supported by the tendency of certain suitable polymeric materials (detailed below) to swell when storing gas, particularly in the three-phase form of the gas storage system where a liquid is also present. The analogy to a sponge is further supported by the ability to increase the rapidity of polymer swelling during gas sorption, through the addition of a small quantity of a swelling promoter (of which examples are given below).

Throughout the general and specific description of the present invention, references to "gas" and to "propellant gas" include elemental gases which may be atomic (for example, argon) or molecular (for example, nitrogen) and further include gaseous compounds (for example, carbon dioxide), or any mixture of such gases; whatever the physical form of a gas when sorbed, it is substantially gaseous when desorbed in contexts where the potential energy of the desorbed gas is required to be converted to useful mechanical work by any known thermodynamic principle, for example by adiabatic or isothermal expansion of an initially pressurised gas. Where references are made below to "propellant gas" and unless the context otherwise prohibits, these should be taken as referring also to reversibly stored gas which is for non-propellant use (for example, as a fuel gas).

As non-limiting examples of polymeric materials which are believed to be suitable for use in one or more aspects of the present invention, there may be cited cross-linked polymers (both homopolymers and copolymers) which tend to swell without substantial dissolution when in contact with a liquid which is or would be a solvent of a chemically equivalent or similar linear polymer; the measure of swelling of any given combination of a polymer and a liquid solvent is believed to give an indication of potential performance in a gas storage and dispensing system according to the invention, at least in the three-phase (gas/liquid/solid) reversible sorption system. The polymeric material may be treated with a swelling promoter to enhance the gas sorption capacity of the polymeric material. Further, while in certain respects, most liquids can be considered as solvents for one or more gases, at least to a limited extent, a liquid solvent for a gas(when used in the second aspect of the present invention) should preferably dissolve a substantial amount of the selected propellant gas (or gas mixture) within the range of pressures at which the gas storage system is intended to work, but substantially without dissolution or other disruptive effect on the polymeric material, and preferably without any substantive effect beyond swelling (if any) of the polymeric material. Moreover, such a liquid solvent for a gas should also meet most or all of the principle desiderata listed above in respect of propellant systems in pressure pack dispensers, including non-toxicity and lack of environmental hazard. Preferred liquid solvents for gases include water and other polar solvents.

A further example of a series of polymeric materials suitable for use in either or both of the first and second aspects of the present invention are the so-called "hydrogels" described and claimed in British Patent GB2108517-B; such a polymeric "hydrogel" may form part of a carbon dioxide/acetone/"hydrogel" 3-phase gas storage and dispensing system as will be detailed below. Preferred swelling promoters for use with dry hydrogels include compounds such as water, acetic acid, chloroform, aniline, meta-cresol, nitrobenzene, and ortho dichlorobenzene.

As further examples of polymeric materials suitable for use in either or both of the first and second aspects of the present invention there are inorganic polymers and pseudopolymers, including silica gels, zeolites and other polymeric or pseudopolymeric silicates; such materials have microvoids or their functional equivalents such that interstitial storage of gas, or of liquid which contains dissolved gas, is possible on a molecular (or larger) scale.

According to a third aspect of the present invention there is provided a gas storage and dispensing system for the substantially reversible storage of a gas, said gas storage and dispensing system comprising a liquid solvent for the gas, the gas being substantially soluble in said liquid solvent to cause the liquid solvent to form a two-phase gas/liquid reversible sorption gas storage system which will tend to sorb increasing quantities of gas in increasing ambient gas pressure, and tend to desorb previously sorbed gas with decreases in ambient gas pressure.

Said liquid solvent may comprise a single compound, or a mixture of compounds. In particular, the liquid solvent may be admixed with a gas sorption promoter.

A preferred liquid solvent is acetone for the reversible sorption of carbon dioxide or of a propellant gas mixture comprising carbon dioxide. The acetone may be admixed with a promoter of carbon dioxide sorption; additionally or alternatively, the acetone may be mixed with one or more other liquid solvents of carbon dioxide and/or of other components of a propellant gas mixture comprising carbon dioxide.

Alternatively or in addition, the propellant gas could comprise nitrogen or oxygen combined with a suitable liquid solvent.

The gas in addition or as an alternative, to being a propellant gas, could be a fuel gas, an oxidiser, an inflation gas, or a breathing gas or a breathing gas mixture.

According to a fourth aspect of the present invention, there is provided a pressure pack dispenser for dispensing a product therefrom by means of the pressure of a propellant gas within the dispenser, said pressure pack dispenser comprising a pressurisable container having a valve for releasing the product from the container, said container enclosing a gas storage and dispensing system according to the first or second or third aspects of the invention, for providing a source of pressurised propellant gas for dispensing the product from the pressure pack dispenser.

The pressure pack dispenser according to the fourth aspect of the invention may comprise a non-barrier dispenser in which the propellant gas is permitted to come into direct contact with the product to be dispensed. The pressure pack dispenser according to the fourth aspect of the invention may alternatively comprise a barrier dispenser in which a gas-impermeable barrier (or a barrier which is substantially impermeable to gas) is located between the product to be dispensed and the gas storage and dispensing system, the barrier being such as to transmit the pressure of the propellant gas to the product while preventing (or substantially preventing) direct contact between the product and the components of the propellant gas storage and dispensing system, including the propellant gas and the polymeric material (if employed) together with the liquid solvent (if employed). The barrier may comprise a flexible bag enclosing the product to be dispensed and sealed to the pressurisable container at or adjacent to the valve; alternatively, the barrier may comprise a piston or piston-form arrangement slidingly sealed to a substantially cylindrical internal surface of the pressurisable container with the product contained between one side of the piston or piston-form arrangement and the valve, the gas storage and dispensing system being housed between the other side of the piston or piston-form arrangement and the non-valve end of the pressurisable container such that the pressure of the propellant gas will tend, in use of the dispenser, to drive the piston or piston-form arrangement towards the valve end of the pressurisable container so as to tend to discharge the product through the valve. A further alternative which may be considered either as a variant of the barrier system or as an intermediate between barrier and non-barrier systems, is a semi-permeable barrier enclosing the gas storage and dispensing system, the semi-permeable barrier being micro-porous or otherwise formed to be permeable to propellant gas but impermeable (or substantially impermeable) to the polymeric material (if employed) and to the liquid solvent (if employed) whereby the semi-permeable barrier passes the propellant gas to pressurise the product by direct contact while maintaining the remaining component or components of the gas storage and dispensing system out of direct contact with the product. The semi-permeable barrier may be in the form of a bag or envelope sealed in liquid-tight manner around the polymeric materials (if employed) and the solvent, (if employed); the bag or envelope may be loose or loosely anchored within the initial mass of product to be dispensed.

According to a fifth aspect of the present invention, there is provided a procedure for pressurising a barrier-type pressure pack dispenser in accordance with the fourth aspect of the present invention and wherein the barrier is the piston or piston-form arrangement, said procedure comprising the steps of inserting a substantially predetermined quantity of the polymeric material (in the case of a dispenser employing the first or second aspects of the present invention) and/or of the liquid solvent (in the case of a dispenser respectively employing the second or third aspects of the present invention) into the pressurisable container on the side of the piston or of the piston-form arrangement not occupied in use by the product to be dispensed, subsequently or substantially simultaneously adding a substantially predetermined amount of a substantially non-gaseous form of the propellant gas to the same part of the pressurisable container as is occupied by the polymeric material and/or by the liquid solvent, and sealing the part of the pressurisable container occupied by the propellant gas and by the polymeric material and/or the liquid solvent.

The substantially non-gaseous form of the propellant gas may comprise the propellant gas cryogenically cooled to a temperature at which the propellant gas is liquefied or solidified; in the particular case of carbon dioxide, solid carbon dioxide is preferred. Where the propellant gas is solidified, the solidified gas is preferably pelletised or in particulate form for greater ease of separating and metering the substantially predetermined amount of propellant gas from a bulk supply thereof. The polymeric material (when employed) may also be pelletised or in particulate form for greater ease of separating and metering the substantially predetermined quantity thereof into the pressurisable container.

A significant advantage of the pressurising procedure according to the fifth aspect of the present invention lies in the ability to load the dispenser with the essential components of the propellant gas storage and dispensing system at ambient atmospheric pressure, with the subsequent thawing and boiling of the initially non-gaseous form of the propellant gas giving rise to the essential gaseous pressure of the propellant.

The product may have been inserted into the pressurisable container, on the valve side of the piston or the piston-form arrangement, prior to the above-described pressurising procedure, either by backfilling through the valve after fitting of the pressurisable container with the piston or the piston-form arrangement, or by insertion of the product into the pressurisable container through the open non-valve end of the container prior to fitting of the piston or the piston-form arrangement; alternatively the product may be inserted into the pressurisable container subsequent to the above-described pressurising procedure, and preferably also subsequent to post-pressurisation safety checks and quality assurance, by backfilling through the valve against whatever pressure has developed on the opposite side of the piston or the piston-form arrangement. Loading of the pressurisable container with the product to be dispensed may utilise the method described in British Patent Specification GB2032006.

BRIEF DESCRIPTION OF THE DRAWINGS

Embodiments of the invention will now be described by way of example, with reference to the accompanying drawings wherein.

DESCRIPTION OF PREFERRED EMBODIMENTS

Figure 1:
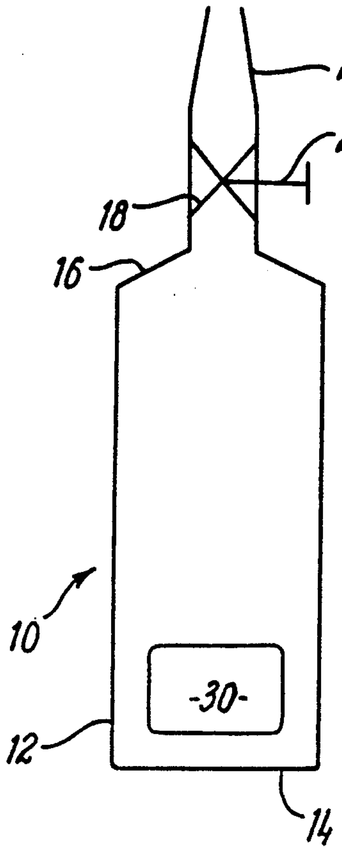
FIGS. 1, 2, 3 and 4 are schematic representations of four embodiments of pressure pack dispenser in accordance with the third aspect of the present invention.

The following exemplary description will firstly refer to polymers in general, and then subsequently refer to various polymers and polymeric materials of relevance to the present invention, followed by references to liquid solvents, propellant gases, pressure pack dispensers (partly with reference to the drawings), dispensable products, and applications of the present invention. Thereafter, some practical examples will be given, together with tabulations of the performances of various combinations of substances in accordance with the invention.

1. Preamble

Polymers are giant molecules formed by the linking of many small molecules which are usually of the same kind, e.g. ethylene polymerises to polyethylene, and so on until long chains are formed. Co-polymers result from the joining together in a similar way of dissimilar molecules.

Such linear polymers are often soluble in solvents; the particular solvent concerned depends on the chemical nature of the polymer, e.g., carbon-chain linear polymers dissolve in hydrocarbon solvents whilst chains containing oxygen or nitrogen dissolve in polar solvents such as ethanol.

Another class of polymers are cross-linked i.e., their separate chains are mutually joined laterally to form a three-dimensional network. When cross-linked the polymeric chains can no longer separate when treated with solvent since the polymeric chains are chemically bound together by the cross linkages. However, there are microvoids in the molecular structure of cross-linked polymers and solvent molecules may occupy these molecular microvoids. When such solvent molecules diffuse into the matrix the chains are forced apart and the cross-linked polymeric matrix swells. It is the particular solvents which cause such swelling, the extent to which the solvent molecules enter the polymeric matrix, and the amount of swelling which are of primary interest to the present invention.

All cross-linked polymers will swell to some extent in a solvent and since very many polymers can be cross-linked then the field of potentially useful polymers is very large. In this invention, those polymers likely to swell only in "undesirable" solvents such as benzene, toluene, or chloro-substituted hydrocarbons, have been relegated to secondary importance. This category includes polymeric materials such as polystyrene. Moreover, some polymers are little affected by solvents (e.g. polyethylene, polypropylene) and these are not considered further. Inorganic chains, as in silicones, are also potentially applicable to the present invention, but are not reviewed in this section.

The present invention is mainly concerned with those polymeric materials which are easily swelled by water and perhaps by related polar solvents. These polymeric materials generally contain polar atoms like oxygen and nitrogen somewhere in the molecular structure of the polymer, either in the backbone chain, in the crosslinks, or in side groups.

Such polymers also occur in nature or are derived from natural products.

2. Specific Polymers

2.1 Cellulose derivatives

Cellulose itself is polymeric and consists of linked sugar units. Many commercial polymers•are based on cellulose (e.g., nitrocellulose, ethylcellulose). Of interest in the present context is sodium carboxymethylcellulose (SCMC) which is the basis of a substance which is strongly swelled by water and forms stable gels. The related nitrocellulose and acetocellulose are linear materials which are soluble in solvents such as acetone.

2.2 Gelatin

Gelatin is a natural product and contains amino acid groupings. Gelatin is highly swelled by water. Gelatin does not appear to swell with either acetone or ethanol.

2.3 Hydrogels from polyvinylalcohol (PVA)

PVA is a linear polymer of formula [CH2-CH(OH)]n. PVA is made from polyvinylacetate. PVA has complex behaviour with water, such behaviour having strong dependence on the "degree of hydrolysis" i.e., the percentage of acetate groups which are transformed into hydroxyl (OH) groups.

A consequence of the existence of OH groups in the structure is the possibility of linking the polymer chains together laterally e.g., with acetaldehyde as denoted below:

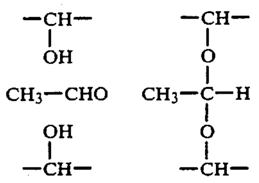

Many other such condensation linkages are possible. Physical means may also be used to achieve cross linkages in polymers, e.g., UV light, heat, electron beams and gamma-radiation.

Nowadays irradiation is a common way to produce high quality cross-linked polymeric material for medical purposes.

The simple linear PVA polymer is 35% crystalline. In water-swollen gels which PVA forms there must be an amorphous matrix in which crystalline regions are included. Heat treatment will lead to a greater degree of crystallinity.

When solvent swelling takes place in PVA, the crystalline regions are not affected by the solvent: the solvent is taken up only by the amorphous regions of the PVA. The crystallites then act as cross-links in the macro-structure. The swelling process continues until an equilibrium is reached. The crystallinity of PVA is not changed by swelling.

The PVA content by weight of a water-swollen hydrogel is not more than 55% when at equilibrium. Because of the mixed amorphous-crystalline nature of such materials it is difficult to determine a density even for dry polymer. When a swollen gel is considered the difficulties multiply. However a density expression has been suggested and this topic is of some importance in the context of a pressure pack dispenser.

Although studies have been made of PVA gels and their interactions with solvents, nothing very systematic has been done. There is also some confusion about what is meant by 'PVA' i.e., whether the material used is linear or cross-linked. Most of the solvents used in studies are alcohol-based e.g., glycerol, ethylene glycol, propane and butanediols. Here one needs temperature up to 142 degrees Centigrade to form a gel. Gelation does occur when acetone is added to PVA solution in dimethylformamide, and this appears to occur in the cold. Overall there is no study reported which leads even remotely to the use of the hydrogel envisaged by the present invention. PVA does offer some possibilities if it can be readily obtained in genuine cross-linked form and this use would be new. Some inorganic acids (boric acid, vanadic acid) will gel PVA but this is of little interest in the present context.

2.4 Poly (2-hydoxyethylmethacrylate) hydrogels (PHEMA)

Here again a linear polymer may be cross-linked using a variety of chemical species. This is normally done in one step, i.e., the initial polymerisation takes place in the presence of a cross-linking agent which may be of divinyl origin. Other acrylates are generally used. Initiation can be by free radicals or by irradiation. A variety of co-monomers may be incorporated so as to modify the chemical and physical properties of the resultant gel.

Swelling studies with water have been carried out. The amount of water taken up is closely related to the water miscibility with the HEMA monomer. The reported uptake appears to be near 40% in the gel. The time of equilibrium swelling with water is not certain but 24 hours appears to complete it (although times of a few minutes are reported). Studies of the kinetics of the solvent uptake are reported. PHEMA polymers would be expected to show differential swelling with cross-linking density but this is not true for water. No good reasons are given for this.

The swelling at equilibrium is also to some extent dependent on temperature but no clear pattern or relationship appears to exist.

The Flory interaction parameter, which governs the compatibility of solvent and polymer, is high (approximately 0.8) for water. This means that the compatibility is limited in this system.

The swelling of PHEMA was studied with a variety of solvents including water, hydrocarbons, chloro derivatives and amines. Unfortunately only physical swelling measurements were made and no record was made of the weight of solvent taken up per gramme of polymer. A rough guide is probably given by the swelling parameter s which was referred to water as unity. Acetone is slightly less effective than water (s=0.97) whilst amines are the most effective swelling agents (s up to 2.0). Since water is taken in to about 45% in the gel, if the relationship of swelling to weight is valid, then it can be expected that about equal weights of acetone and PHEMA hydrogel will be found in a swelled sample. Polyethylene oxide hydrogels have been found to take up 3–4 times their own weight of acetone. The point will have to be checked experimentally since there must be a favourable differential rate of release of $CO_2$ from an acetone/PHEMA swelled hydrogel.

Oxygen will diffuse through a membrane composed of PHEMA and this diffusion, as expected, depends on the water content of the membrane material. This probably means that the $O_2$ dissolves in the occluded water and passes from site to site through the polymeric matrix of the membrane material.

2.5 Polyethylene oxide (PEO) and related Hydrogels

Ethylene oxide ($CH_2CH_2O$) can be polymerised in various ways giving polymeric products of a wide variety of molecular weights. Polymerised ethylene oxide compounds with molecular weights of several millions can be prepared as highly viscous solutions.

Linear polyethylene oxide has a regular structure and is normally highly crystalline. The maximum melting point is in the region of 700° C. The degree of crystallinity in PEO hydrogels has a marked effect on the interaction with solvents.

Linear PEO polymers dissolve in water and various solvents and the differential compatibility with the solvent is carried over into the swelling of cross-linked hydrogels.

The insoluble cross-linked materials may be formed in a number of ways including radiation of the polymer with chain hydroxyls. Radiation techniques have been used particularly in the USA (Union Carbide Corporation). A good method is that which introduces covalent cross-linking. The hydroxyl groups on the polymers can be caused to react with aromatic or aliphatic diisocyanates and a polyol at 100 degrees Centigrade. In this way effective cross-linking is brought about.

An important feature of these cross-linked materials is that they retain a large measure of crystallinity. Cross-linked polymer gels containing over 90% polyethylene oxide have been examined with respect to their solvent uptake and swelling. Many solvents are active in this interaction stemming from several classes of compound. Table 1 (below ) shows the percentage swelling of such cross-linked polymer gels for some solvents. Halogenated solvents are very active as also are certain hydroxy compounds such as m-cresol and benzyl alcohol. The swelling phenomenon generally increases with temperature but water is anomalous in that the swelling decreases with temperature.

The swelling properties can be generally explained as follows. The crystalline regions of the cross-linked polymer need to be fused in order to allow solvent penetration. Certain solvents supply a heat of mixing which fulfils this energy. For other solvents the heat of mixing is too low and hence swelling is only observed when the temperature is raised and the crystallites are melted. Acetone belongs to this latter category. Hence addition of a small quantity of water to the acetone to be used will aid the production of swelled material. Certain other solvents should act in the same way.

TABLE 1

| Solvent | % Swelling |
|---|---|
| p-Cymene | 264 |
| Chloroform | 1096 |

TABLE 1-continued

| Solvent | % Swelling |
|---|---|
| Benzene | 346 |
| Toluene | 209 |
| Tetrahedronaphthalene | 605 |
| Acrylonitrile | 333 |
| Nitrobenzene | 600 |
| O-dichlorobenzene | 694 |
| Ethyl benzoate | 358 |
| Methyl Methacrylate | 254 |
| Benzaldehyde | 659 |
| Acetaldehyde | 496 |
| Methyl benzoate | 496 |
| Dimethyl Phthalate | 658 |
| Furfural | 745 |
| Aniline | 826 |
| Butyrolactone | 503 |
| Cyclohexanone | 308 |
| Acetic Acid | 824 |
| m-Cresol | 1409 |
| Quinoline | 641 |
| Acrylic Acid | 828 |
| Benzyl Alcohol | 1017 |
| Propylene Glycol | 452 |
| Formamide | 548 |
| Water | 436 |

2.6 Polyacrylamide

Polyacrylamide is extremely efficient in absorption of water and swells strongly. The behaviour of polyacrylamide with other solvents is not well documented. Other water-absorbent materials include the cross-linked dextrans and expanded forms of silica gel.

2.7 Polystyrene

Many cross-linked polystyrenes show a wide range of permeability to solvents depending on the degree of cross-linking. Most of the solvents employed are in the hydrocarbon series, some are chlorinated or are other aromatic-based liquids.

2.8 Polyurethanes

Again solvent absorption depends on cross-linking. Experiments done have measured the swelling obtained without apparently recording the proportion of solvent absorbed. Some measure of the latter is afforded by the percentage swelling achieved. Table 2 (below) shows the effects of different solvents and, in this group, some of the results are of interest.

TABLE 2

| Polyurethane (Adiprene C) Swelling (%) | | |
|---|---|---|
| Benzene | Heptane | Carbon tetrachloride |
| 140 | 30 | 12 |
| Ethanol | Methyl Ethyl Ketone | Water |
| 75 | 125 | 10 |

2.9 Other Polymers

Co-polymers of butadiene and styrene yield materials which give gels with solvents as shown in Table 3a (below). Similar behaviour is observed for the co-polymer with acrylonitrile as shown in Table 3b (below).

The co-polymer between vinylidiene fluoride and hexafluoropropene absorbs significant quantities of ketones such as acetone as shown in Table 3c (below). The importance of this last group is that they do absorb acetone whereas the hydrocarbon-based polymers favour the uptake of hydrocarbon or chlorinated solvents. These latter are undesirable either because of poor gas absorption or environmental considerations.

TABLE 3a

| Polybutadiene-styrene Swelling (%) | | |
|---|---|---|
| Benzene | Carbon tetrachloride | Acetone |
| 500 | 3-500 | 3-10 |

TABLE 3b

| Polybutadiene-Acrylonitrile* Swelling (%) | | |
|---|---|---|
| Benzene | Carbon tetrachloride | Acetone |
| 140 | 80 | 170 |
| Ethanol | | |
| 10-20 | | |

*contains 45% acrylontrile

TABLE 3c

| Vinylidene fluoride-hexafluoropropene Swelling (%) | |
|---|---|
| Acetone | Methyl ethyl Ketone |
| 280 | 290 |

2.10 Hydrogels according to British Patent GB2108517

British Patent GB2108517-B describes and claims hydrogels which comprise polymerised moieties derived from (i) at least one polymerisable unsaturated cyclic ether (or thio-ether) and (ii) at least one hydrophillic homopolymer or copolymer.

It has been surprisingly found that much hydrogels have reversible gas sorption properties rendering them particularly suitable for use as the polymeric solid phase in two-phase gas/solid reversible sorption gas storage systems in accordance with the first aspect of the present invention, and as the polymeric solid phase in three-phase gas/liquid/solid reversible sorption gas storage systems in accordance with the second aspect of the present invention.

When utilised in the latter three-phase gas/liquid/-solid gas storage system with carbon dioxide as the gas and with acetone as the liquid solvent, it has been found that the rapidity of swelling of the dry hydrogel as ambient indoor temperature ("room temperature") may be increased markedly by the addition of small quantities of one or more swelling promoters. As swelling promoters, compounds such as water, acetic acid, chloroform, aniline, meta-cresol, nitrobenzene, and ortho dichlorobenzene are effective. Addition of these swelling promoters at the level of 10 volume percent has been carried out successfully. Among these swelling promoters, acetic acid, aniline, and meta-cresol are preferred because of their effectiveness and lack of toxicity. (The swelling of hydrogel in the pure solvents previously referred to in this specification is already known).

Moreover, in such a carbon dioxide/acetone/hydrogel propellant system as applied to a barrier-type pressure pack dispenser, a pressure differential exists between the carbon dioxide pressure within a dispenser full of dispensible product and the carbon dioxide pressure within the same dispenser when the dispensible product is fully evacuated. This is necessarily so because the equilibrium between carbon dioxide in the gaseous state and carbon dioxide sorbed in acetone solution is constant at a given temperature, resulting in a decrease in propellant pressure consequent upon the increase of propellant chamber volume within the dispenser as the product chamber progressively diminishes in volume with dispensing of the product. When a small quantity of hydrogel swelling promoter is added to the acetone, the result is an advantageous modification of this pressure differential, in that the ratio of high pressure (dispenser full) to low pressure (dispenser exhausted) is increased. In other words, there is a reduced variation of propellant pressure with differing quantities of product remaining to be dispensed, and the initial propellant pressure for a given terminal pressure is reduced, resulting in a reduced peak pressure.

The most effective hydrogel swelling agents in this respect are meta-cresol and acetic acid. These, when added at the 10 percent level and in comparison with acetone alone as the liquid phase, reduce the carbon dioxide propellant pressure differential by 9–10 percent, and in comparison with an acetone/water mixture as the liquid phase, reduce the pressure differential by about 5 percent.

The same advantages apply in a non-barrier pressure pack dispenser despite there being no distinct propellant and product chambers, and the propellant system being unseparated from the product.

Considering hydrogel swelling promoters in the more general sense as being gas sorption promoters, it may be noted that gas sorption promoters in general (and not only hydrogel swelling promoters) will have advantageous effects by reducing propellant pressure differentials in particular, and probably also by improving gas storage efficiency in general, by their admixture with liquid solvents of gases, both in three-phase gas/liquid/solid systems and in two-phase gas/liquid systems.

The particle size of dry hydrogel has been found to be important in the performance of reversible sorption two-phase and three-phase gas storage systems employing hydrogel as the polymeric solid phase. If smaller hydrogel particles are used in a pressure pack dispenser, the propellant pressure differential decreases. A difference of 11–12 percent in pressure differential is observed between hydrogel particles of 2000 microns diameter and those of 350 microns diameter, demonstrating the relative advantage of employing smaller particles. (It should be noted that despite the increasingly fluent properties of hydrogel particles as their size diminishes, the hydrogel (and alternative microporous polymers) does not per se become liquid, and remains the solid phase in any two-phase or three-phase reversible sorption gas storage and dispensing system in which they are employed.

3.0 Other Polymeric and Pseudopolymeric Materials

Other suitable polymeric and pseudopolymeric materials suitable for use in the invention include natural and artificial zeolites and molecular sieves (aluminosilicates with characteristic microvoids analogous to those referred to in respect of cross-linked polymers), clathrates, and various other silicon compounds and silicon forms, including silica (particularly in gel form).

4.0 Liquid Solvents

The liquid solvents that may be employed in the 3-phase reversible sorption gas storage system in accordance with the second aspect of the invention and/or in the 2-phase reversible sorption gas storage system in accordance with the third aspect of the present invention include (but are not restricted to) water and the other solvents listed above in Table 1, and other suitable solvents, such as acetone, having the general characteristic of dissolving gas while being substantially insoluble of the polymeric material being utilised in any particular 3-phase system. While not being limiting on the scope of the present invention, it is believed that in the 3-phase systems the extent to which the polymeric material soaks up the liquid solvent (measured as volume or weight of liquid per unit weight of polymeric material) and/or the extent to which the polymeric material swells under the influence of the liquid solvent (measured as swollen volume over initial volume), are measures of the potential gas storage performance of a given combination of polymeric material and liquid solvent. While the use of substantially pure solvents is envisaged above, it is envisaged that compatible mixtures of two or more liquid solvents may be suitable for use in certain aspects of the invention; some such mixtures may be more practicable than pure solvents, as (for example) commercial ethanol is less often anhydrous than in aqueous solution.

In any event, minor quantities of impurities normally present in commercial-grade or industrial-grade liquid solvents (as distinct from relatively pure laboratory-grade liquid solvents) do not significantly or adversely affect the basic principles of the present invention in any of its aspects.

In addition to the above-mentioned functional requisites of a technically suitable liquid solvent, regard should also be had to the general desiderata previously recited, particularly including the safety factors such as toxicity and environmental hazard. For such reasons, "benign" solvents such as water and lower alcohols (e.g. ethanol) are more likely to satisfy these desiderata than known biohazards such as chlorinated hydrocarbons and benzene, but in appropriate circumstances such considerations need not prevent adoption of liquid solvents that would be non-preferred in other circumstances (particularly if containment was assured and recycling was reliable); thus no particular solvent is absolutely excluded from the scope of the present invention.

Other factors, such as economy and availability, may also influence a choice of liquid solvent or solvent mixture.

5.0 Propellant Gases

Within the general desiderata previously listed, preference in choice of a propellant gas or gas mixture may be given to the "benign" gases, for example carbon dioxide, nitrous oxide, nitrogen, oxygen, and mixtures of these such as nitrogen/oxygen mixtures including "natural" air (which could be considered as the ultimately non-polluting propellant gas for pressure pack dispensers). However, such preferred propellant gases are not an exclusive category, and in suitable circumstances other technically suitable gases may be adopted, for example ammonia or sulphur dioxide. Again, minor quantities of impurities normally present in commercial-grade or industrial-grade gases (as distinct from relatively pure laboratory-grade gases) do not significantly or adversely affect the basic principles of the present invention in any of its aspects.

6.0 Pressure Pack Dispensers

Four basic types of pressure pack dispenser in accordance with the fourth aspect of the present invention will now be described with reference to FIGS. 1–4 which are highly schematic representations of the basic elements of these four types. In FIGS. 1–4, elements which are common to all four types of pressure pack dispenser are denoted by the same reference numerals.

Figure 2:
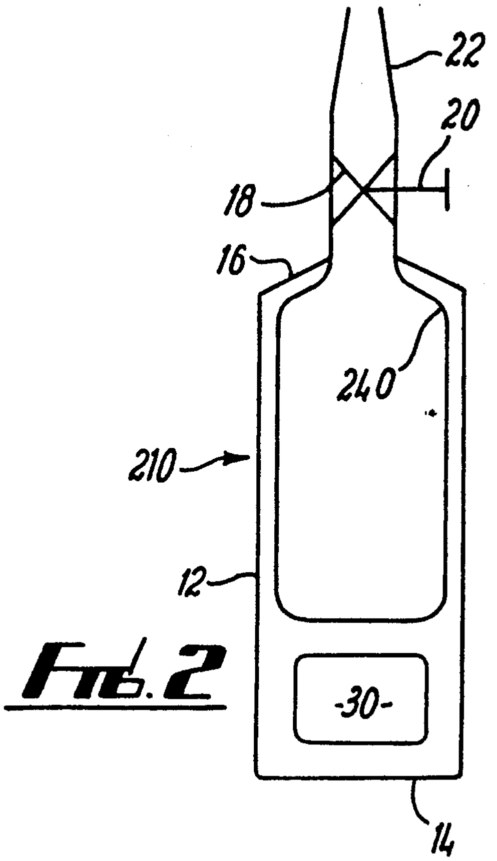
Figure 3:
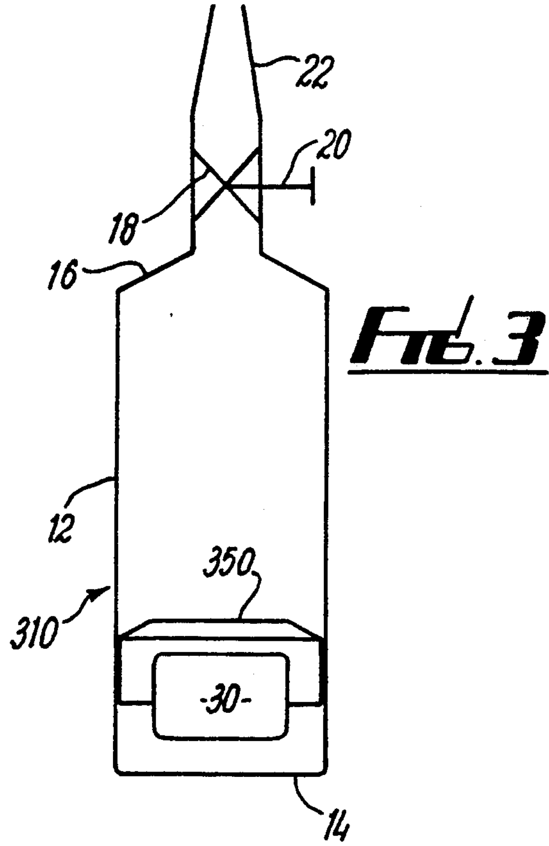
Figure 4:
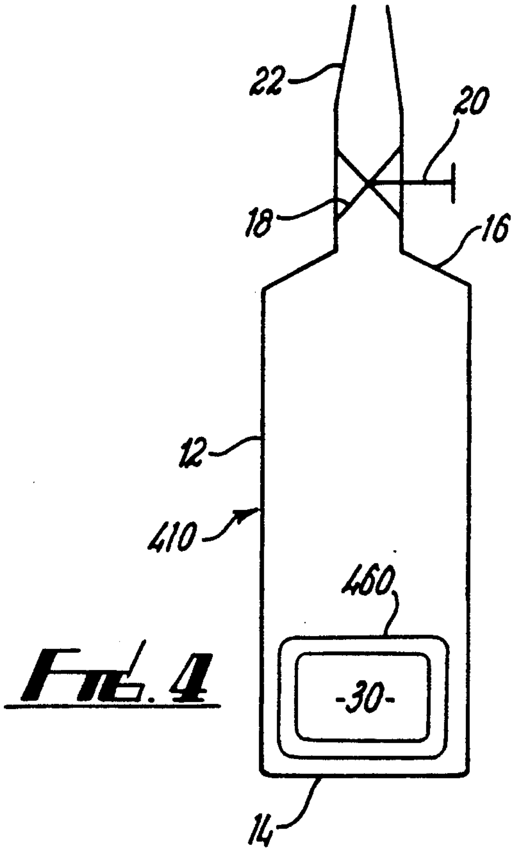

The four basic types of pressure pack dispenser are:

(A) A non-barrier dispenser (FIG. 1);

(B) A barrier-type dispenser with an impermeable flexible bag surrounding the product (FIG. 2);

(C) A barrier-type dispenser with a sliding piston between the product and the propellant (FIG. 3); and, (D) A dispenser with a semi-permeable envelope enclosing the propellant (FIG. 4).

Referring now to FIG. 1 in detail, this drawing schematically depicts a non-barrier type of pressure pack disperser 10 comprising a cylindrical body 12 which is conveniently formed of sheet metal (but which can be formed of any other suitable material).

The dispenser body 12 is closed at its lower end by a base closure 14 which may be formed integrally with the body 12 or which may be separately formed and subsequently secured to the body 12 in a leak-tight manner. If separately formed, the base closure 14 is formed of a material which is compatible with the body 12 when secured thereto.

The dispenser body 12 is closed at its upper end by a top closure 16 which may be formed integrally with the body 12 or which may be separately formed and subsequently secured to the body 12 in a leak-tight manner. If separately formed, the top closure 16 is formed of a material which is compatible with the body 12 when secured thereto.

The top closure 16 incorporates a dispenser outlet product flow control valve 18 which is normally closed to a product-flow-blocking condition but which can be temporarily opened to a product-flow-passing condition by manual operation of a manually operable valve control member 20, in the form of a lever or a plunger or any other suitable form of manually operable valve control member. A form of manually operable valve and manually operable valve control member suitable for use in pressure pack dispensers in accordance with the present invention is described and claimed in European Patent EP0243393-B1, but any other suitable form of valve arrangement can be employed without departing from the scope of the invention.

The valve 18 can be formed integrally with the top closure 16, or the valve 18 can be formed separately and secured to the top closure 16 in a leak-tight manner. If formed separately, the valve 18 is formed of a material which is compatible with the material of the top closure 16 when secured thereto.

Product released from the dispenser 10 through the valve 18 is dispensed via a nozzle 22 or other suitable form of product conduit (for example, a pipe). The nozzle 22 or other product conduit can be formed integrally with the valve 18, or the nozzle 22 or other product conduit can be formed separately and then temporarily or permanently attached to the valve 18. Temporary attachment of the nozzle 22 or other product conduit to the valve 18 permits detached stowage of the nozzle or conduit when the dispenser 10 is not in use, and also permits different forms of the nozzle 22 to be selectively employed according to circumstances and/or user choice; for example, a relatively wide nozzle and a relatively narrow nozzle could be alternately employed for the dispensing of respectively relatively wide and relatively narrow strips of semi-fluent product (e.g. silicone sealant). Permanent attachment of the nozzle 22 or other product conduit to the valve 18 allows the dispenser manufacturer to control at least this aspect of product dispensing operations where, for example, the shape and/or size of the nozzle have a significant effect on the perceived quality of the dispensed product.

The product to be dispensed from the pressure pack dispenser 10 is held prior to being dispensed within the dispenser body 12, between the closures 14 and 16, and partly filling this internal volume of the dispenser 10. Within this same internal volume of the dispenser 10 is a propellant gas storage and dispensing system 30 in accordance either with the first aspect of the present invention or with the second aspect of the present invention or with the third aspect of the present invention, i.e., the propellant system 30 is a two-phase gas/solid reversible sorption gas storage system or a three-phase gas/liquid/solid reversible sorption gas storage system or a two-phase gas/liquid reversible sorption gas storage system as previously described, and loaded with a suitable propellant gas (either a single propellant gas or a propellant gas mixture).

With the dispenser 10 in its ready-to-use condition, some propellant gas will have been released by desorption from the internal propellant gas storage and dispensing system 30 such as to pressurise the product within the dispenser 10, such release continuing until equilibrium conditions pertain. Upon manual operation of the valve control member 20, the dispenser outlet product flow control valve 18 is temporarily changed from its normally closed product-flow-blocking condition to an open product-flow-passing condition which releases pressurised product through the valve 18 to be dispensed through the nozzle 22. Thus far, operation of the pressure pack dispenser 10 is conventional except for the means of initial pressurisation. However, the product dispensing operation brings the internal pressure conditions into reduced-pressure disequilibrium, and this will tend to cause further desorption of propellant gas from the propellant system 30 such as at least partially to restore internal pressurisation. This self-regulating repressurisation mechanism will be self-sustaining during use of the pressure pack dispenser 10, albeit that propellant gas pressure may tend to have diminishing equilibrium values with increasing quantities of dispensed product, until substantial exhaustion of either dispensible product or desorbable propellant gas stored in the propellant gas stored in the propellant gas system 30. The propellant gas storage and release system 30 distinguishes the pressure pack dispenser 10 from prior-art dispensers employing single-phase gas-only or two-phase gas/liquefied-gas propellant systems, and furthermore provides advantages not previously attainable.

The pressure pack dispenser 10 schematically depicted in FIG. 1 essentially differs from the pressure pack dispensers schematically depicted in FIGS. 2, 3 and 4 by the fact that the FIG. 1 dispenser is a non-barrier type of dispenser, i.e., there is no barrier between the propellant gas storage and dispensing system 30 and dispensible product held within the internal volume of the dispenser 10.

Components and sub-assemblies of the dispensers described below with reference to FIGS. 2, 3 and 4 which are common to the same or functionally equivalent components and sub-assemblies of the pressure pack dispenser of FIG. 1 will be denoted by the same reference numerals; for a description of such components and sub-assemblies as utilised in the pressure pack dispensers of FIGS. 2, 3 and 4, reference should be made to the relevant parts of the foregoing description of the pressure pack dispenser 10 of FIG. 1.

It has already been mentioned in respect of certain parts of the pressure pack dispenser 10 of FIG. 1 (the body 12, the closures 14 and 16, and the valve 18) that where different, the materials of such parts are mutually compatible when assembled. It should also be taken that whether the same or mutually different, the material or materials of which the various parts of the dispenser 10 are made are also selected to be compatible with the dispensible product and with the materials employed in the propellant gas system 30. Thus the material or materials of the dispenser 10 should not react with or cause degradation of the dispensible product to any unacceptable extent (or, if feasible, at all), nor should the dispenser or any part of it be significantly corroded or otherwise adversely affected by the dispensible product or by any component of the propellant system. Similarly, the dispensible product and the components of the propellant gas system 30 should be mutually compatible.

Referring now to FIG. 2, this drawing schematically depicts a barrier-type pressure pack dispenser 210 which essentially differs from the non-barrier type of dispenser 10 (FIG. 1) by the provision of a flexible bag 240 fastened by its neck to the top closure 16. The material of the bag 240 is impermeable to the components of the propellant gas storage system 30, and in particular is impermeable to the propellant gas stored in and dispensed by the system 30. Nevertheless, the material of the bag 240 is sufficiently flexible as substantially freely to transmit fluid pressure therethrough.

Thus, with dispensible product loaded inside the bag 240, and with the remainder of the internal volume of the dispenser 210 (i.e., the volume outside the bag 240 but inside the body 12) occupied by the reversible sorption propellant gas storage and dispensing system 30 and by the propellant gas emitted by the system 30, the dispensible product is pressurised for controlled release through the valve 18 but without being in direct contact with the pressurised propellant gas. Moreover, and in contrast to the non-barrier dispenser 10 of FIG. 1, the barrier-type dispenser 210 of FIG. 2 does not release propellant gas into the ambient atmosphere in normal operation.

Another form of barrier-type pressure pack dispenser is schematically depicted in FIG. 3, to which reference will now be made.

As shown in FIG. 3, this alternative barrier-type pressure pack dispenser 310 essentially differs from the non-barrier type of dispenser 10 shown in FIG. 1 by the provision of a piston 350 which is slidable within the cylindrical dispenser body 12 and forms a substantially leak-tight seal therewith to separate the reversible sorption propellant gas storage and dispensing system 30 from dispensible product held within the dispenser 310 above the piston 350.

Thus, in a manner similar to the flexible bag 240 of the barrier-type dispenser 210 shown in FIG. 2, the piston 350 of the barrier-type dispenser 310 maintains the dispensible product out of direct contact with the components of the propellant gas system 30 while transmitting the pressure of the propellant gas to the dispensible product for controlled release through the valve 18. As with the barrier-type dispenser 210, the barrier-type dispenser 310 does not release propellant gas into the ambient atmosphere in normal operation.

The piston 350 may be a single piston or it may be a composite piston assembly. Forms of piston suitable for carrying out this aspect of the present invention are described in European Patent Specification EP0089971, but any other suitable form of piston can be employed without departing from the scope of the present invention.

Referring now to FIG. 4, this drawing schematically depicts a form of pressure pack dispenser which differs somewhat from the non-barrier dispenser 10 of FIG. 1 and from the barrier-type dispensers 210 and 310 of FIGS. 2 and 3.

In FIG. 4, the pressure pack dispenser 410 differs essentially from the non-barrier dispenser 10 of FIG. 1 by the provision of a semi-permeable containment 460 enclosing the reversible sorption propellant gas storage and dispensing system 30. The containment 460 may be in the form of a bag or an envelope or any other suitable form sealed in liquid-tight manner around the propellant gas system 30, and of a material which is micro-porous or otherwise formed to be permeable to propellant gas emitted by the propellant gas system 30 but to be impermeable to the other, non-gaseous, components of the system 30. The containment 460, with the enclosed propellant gas system 30, may either be loose within the dispenser body 12 or be loosely anchored within the body 12. Thus the containment 460 permits the propellant gas to pass relatively freely into the dispensible product as in the dispenser 10 of FIG. 1, but unlike the dispenser 10 of FIG. 1, in the dispenser 410 of FIG. 4, the containment 460 keeps the non-gaseous components of the propellant gas system 30 out of direct contact with the dispensible product. Such selective separation can be advantageous in allowing choice of non-gaseous components of the propellant system which need not be such as to permit direct contact with the dispensible product, while allowing such advantages as may follow from the propellant gas being in direct contact with the dispensible product.

When fabricating any of the pressure pack dispensers of FIGS. 1 to 4, either or both of the closures 14 and 16 may be formed separately from the body 12 so as to enable or facilitate the placement of components and/or materials within the dispenser, with subsequent fastening of the closure or closures to the body. In the particular case of the piston-barrier dispenser 310 of FIG. 3, it would normally be essential for at least one of the closures 14 and 16 to be formed separately from the body 12 so as to allow fitting of the piston 350 in to the body 12. However, precise mechanical details are not in any event relevant to the present invention since its essential basis lies inter alia in the use of the novel gas storage and dispensing system in a pressure pack dispenser whose other features may or may not be already known per se. Thus the novel gas storage and dispensing system can be employed to pressurise pressure pack dispensers optionally incorporating previously known features or as an alternative means of pressurising existing pressure pack dispensers.

In respect of the various types of pressure pack dispenser depicted in FIGS. 1 to 4, it should be noted that these drawings are highly schematic, and while they are intended to show the interrelationships of the various components and sub-assemblies of these dispensers, the drawings are not to be taken as showing actual or relative dimensions. In particular, the depiction of the propellant gas storage and dispensing system 30 is purely schematic; reference should be made to other parts of the present description of the invention for details of the various forms that a propellant gas system can take within the scope of the present invention.

General types of pressure pack dispenser (barrier, non-barrier, semi-permeable barrier) have been described above. In principle, all types and designs of gas-pressure-operated pressure pack dispensers are suitable for use in the present invention, the adoption or exclusion of any particular design of dispenser depending on immediate factors which may be outside the scope of the present invention. For example, the previously mentioned publication EP0089971 describes a barrier-type pressure pack dispenser suitable for use with the present invention; in this instance moisture in the propellant chamber is liable to cause premature curing of a silicone product held in the dispenser (by leakage of the moisture past the piston seal), but by choosing a gas storage and dispensing system which is hygroscopic, such unwanted moisture can be trapped before it damages the product.

A non-barrier pressure pack dispenser is described in GB1535512.

A special instance of a pressure pack dispenser suitable for use with the present invention is a fire extinguisher, in which a fire-extinguishing or fire-controlling substance is delivered as a jet or spray of liquid, foam, powder, or vapour cloud.

The present invention is applicable to foam generators of all kinds.

7.0 Products to be Dispensed

In general terms, any substance which is dispensable from a pressure pack dispenser is suitable for use with the present invention, subject to the usual practical limitations for such substances (including compatibility of the product with the propellant in non-barrier and semi-permeable barrier systems).

Without prejudice to the generality of the foregoing, substances suitable for dispensing from a pressure pack dispenser include lubricant compositions, anti-corrosion agents, de-icers, sealing compounds, paints, insecticides, polishes, cosmetics, and pharmaceutical substances.

A lubricant composition which is suitable to be dispensed from a non-barrier or semi-permeable barrier pressure pack dispenser is described in British Patent Specification GB1528159 (in this example, the combination of the dispenser and the propellant system functions as a foam generator).

It is also within the scope of the present invention that the propellant gas constitutes or comprises part of the dispensed product; for example as inflation gas for inflating articles such as tires or balloons, as gaseous fuel or oxidiser in combustion, cutting, or welding systems, and as a breathing gas or breathing gas mixture.

8.0 Tabulated Examples (Table 4)

Series of tests were carried out utilising a pressure pack dispenser manufactured by Rocep Pressure Pack Limited, and generally as described in European Patent Specification EP0089971. In all tests except one datum test in each series, the propellant-holding chamber of the dispenser was loaded with a stated weight of a polymeric material in particulate form and consisting of a "hydrogel" as described in British Patent Specification GB2108517. In all instances, the stated volume of acetone was also added to the propellant-holding chamber, to give a series of tests with each series consisting of tests on a gas-storing liquid/solid (acetone/hydrogel) substrate with the stated weight percentage of acetone, plus a polymer-free acetone-only datum test for comparison (denoted with a * in the "weight of swelled solid" column). Finally, the stated weight of carbon dioxide was added to the propellant-holding chamber, which was then sealed. The initial volume of the propellant-holding chamber was 32 milliliters. The initial pressure of propellant, and final propellant pressure at the nominal termination of dispensing were measured, are recorded in Table 4 below together with the difference between initial and final pressures. (A low pressure difference, and a high ratio of final pressure to initial pressure, are indicators of a relatively good propellant gas storage and dispensing performance).

TABLE 4

| | Carbon dioxide/acetone/hydrogel system | | | | |
|---|---|---|---|---|---|
| Wt. of Swelled Solid (g.) | Vol. of Acetone Absorbed (ml.) | Wt. of Carbon Dioxide (g.) | Initial Pressure (psi)/ (× $10^5$ Pa) | Final Pressure (psi)/ (× $10^5$ Pa) | Pressure Diff'ce (psi)/ (× $10^5$ Pa) |
| | Substrate Composition 61.2 wt % Acetone | | | | |
| 10.27 | 7.97 | 1.01 | 86 (5.9) | 40 (2.8) | 46 (3.2) |
| 9.50 | 7.37 | 1.00 | 81 (5.6) | 39 (2.7) | 42 (2.9) |
| 7.50 | 5.82 | 1.01 | 92 (6.3) | 42 (2.9) | 40 (2.8) |
| * | 5.82 | 1.01 | 136 (9.4) | 49 (3.4) | 87 (6) |
| 7.33 | 5.69 | 1.01 | 86 (5.9) | 40 (2.8) | 46 (3.2) |
| | Substrate Composition 64.0 w % Acetone | | | | |
| 10.25 | 8.31 | 1.15 | 99 (6.8) | 48 (3.3) | 51 (3.5) |
| * | 8.31 | 1.15 | 130 (9) | 52 (3.6) | 78 (5.4) |
| 9.40 | 7.62 | 1.16 | 103 (7.1) | 52 (3.6) | 51 (3.5) |
| 6.40 | 5.19 | 0.93 | 115 (7.9) | 48 (3.3) | 67 (4.6) |
| | Substrate Composition 66.4 wt % Acetone | | | | |
| 10.40 | 8.75 | 1.12 | 80 (5.5) | 40 (2.8) | 40 (2.8) |
| * | 8.75 | 1.12 | 122 (8.4) | 52 (3.6) | 72 (4.9) |
| 10.40 | 8.42 | 1.23 | 96 (6.6) | 48 (3.3) | 48 (3.3) |
| 3.55 | 2.99 | 1.10 | 130 (9) | 51 (3.5) | 79 (5.4) |
| | Substrate Composition 79.8 wt % Acetone | | | | |
| 9.84 | 9.95 | 1.05 | 74 (5.1) | 40 (2.8) | 34 (2.3) |
| * | 9.95 | 1.05 | 94 (6.5) | 44 (3) | 50 (3.5) |
| 8.48 | 8.58 | 1.40 | 101 (7) | 56 (3.9) | 45 (3.1) |
| 6.05 | 6.12 | 1.02 | 93 (6.4) | 50 (3.4) | 43 (3) |

Table 4 indicates that a 3-phase gas/liquid/solid reversible gas storage system in accordance with the invention has a superior performance (in terms of pressure maintenance) to the carbon dioxide/acetone system tested for comparison. Nevertheless, reversible gas sorption gas/liquid solvent gas storage and dispensing systems (including but not restricted to carbon dioxide-/acetone systems) are comprised within the scope of the present invention, and may be employed in suitable circumstances, for example where parameters of the pressure pack dispenser and/or the dispensible product so permit.

It is believed that a reversible sorption process is responsible for the superiority of the gas/solid, gas/-liquid/solid and gas/liquid gas storage and dispensing systems of the present invention over the prior art, but in any event the pressure sustaining capacity is improved over gas-only systems, and the present invention provides concomitant advantages in terms of meeting previously recited desiderata for a safe and environmentally non-damaging system.

9.0 Permeation of Carbon Dioxide Through Composite Piston Barriers

This section of the exemplary description concerns piston-barrier pressure pack dispensers as generally described above with reference to FIG. 3, and more specifically pressure pack dispensers with composite pistons, as detailed (for example) in European Patent Specification EP0089971.

The latter publication discloses a barrier-type pressure pack dispenser employing a composite piston (which may be a double piston) incorporating a deformable sealant material to limit penetration of the propellant gas into the dispensible product.

In such a pressure pack dispenser with a double piston sandwiching a deformable sealant material, and wherein the propellant chamber is loaded with a reversible sorption carbon dioxide storage and dispensing system as a source of propellant gas in accordance with the invention, measurement of the permeation rate of carbon dioxide through the double-piston barrier system have been carried out using different liquid sealants.

Effective (low permeation) piston sealant materials have been found to include materials from the "Hyvis" (TM) series, namely the Hyvis "H10", "H30", "H150", "H200" and "H2000" materials, and mixtures of these materials. These "Hyvis" materials are high viscosity poly-hydrocarbons, whose viscosity increases markedly with increases in the respective reference numeral.

Efficient piston sealants with low rates of permeation of carbon dioxide are also provided by polyvinyl chloride filled with proportions of copper powder or of iron powder.

10.0 A Preferred Form Of Pressure Pack Dispenser

The basic form of pressure pack dispenser described in this section of the exemplary description as a preferred form of dispenser (given by way of non-limiting example) is described in European Patent EP0243393-B1 (also published as PCT Patent Publication WO87/02335 and as U.S. Pat. No. 4,826,054).

In more detail, the preferred dispenser has a nominal capacity of 100 milliliters, and is provided with a double-piston barrier system (as detailed in Section 9 above) incorporating a piston sealant composed of 10 milliliters of a mixture of "Hyvis 2000"/"Hyvis 04" in 75:25 ratio by weight. This piston is driven by a propellant contained in a propellant chamber having an initial volume of 32 milliliters. The propellant system comprises 10 grammes of a swelled hydrogel consisting of 3.3 grammes of hydrogel and 6.7 grammes of acetone. To this liquid solvent/microporous polymer reversible gas sorption system are added 1.1 grammes of carbon dioxide.

The dispenser was loaded with a dispensible product consisting of a silicone or acrylic moisture sealant.

The initial propellant pressure of this pressure pack dispenser is 105 psi (pounds per square inch), and the final propellant pressure is 40 psi. This arrangement provides a good and controllable flow of product at all stages of evacuation.

11.0 Carbonating Acetone To Form Propellant Systems

This section of the exemplary description concerns various practical methods of metering carbon dioxide into measured quantities of acetone to form a two-phase reversible sorption gas/liquid-solvent propellant gas storage and dispensing system.

A problem with such carbon dioxide/acetone propellant systems lies in the difficulties of ensuring that a correct quantity of carbon dioxide is placed in the propellant chamber of a piston-type or bag-type pressure pack dispenser before the propellant chamber is sealed. Too little carbon dioxide will result in a deficiency of propellant pressure with an adverse effect on dispensing of the product, whereas an excess of carbon dioxide will result in over-pressure of the propellant with a consequent danger of the dispenser bursting.

Measuring of the mass of carbon dioxide propellant can be simplified by providing the carbon dioxide in the form of relatively uniform pellets of cryogenically solid-frozen material. As a liquid, the acetone solvent is relatively easily metered by simple volumetric measurement, or by direct weighing.

However, since the carbon dioxide pellets have a very low temperature of around −80 degrees Centigrade, their simple addition to acetone at ambient temperature will lead to rapid vaporisation of the carbon dioxide, and consequent loss of propellant gas instead of its necessary sorption in the acetone. This section describes a number of non-limiting examples of procedures for obviating or mitigating this problem.

11.1 First Procedure

The first (and relatively simplistic) procedure is employed with a pressure pack dispenser of the type described in European Patent Specification EP0089971, in which the propellant chamber is closed by a lower end closure of the dispenser, this closure having a filling hole sealable by a plug. The requisite quantity of gas-free liquid acetone is poured through the filling hole into the propellant chamber while the dispenser is inverted. Then the appropriate quantity of pelletised carbon dioxide (1 or more pellets) is dropped through the filling hole into the acetone and the plug is immediately inserted into the filling hole to seal the propellant chamber. If the plug is immediately applied, relatively little propellant gas will be lost by vaporisation and venting. The sealed dispenser may then be agitated to assist sorption of the rapidly gasifying carbon dioxide in the acetone. The risk of this procedure lies in a probable over-pressurisation of the dispenser in the interval between vaporisation and sorption of the carbon dioxide, with a consequent risk of the dispenser bursting. Further, control of resultant propellant pressure may be difficult because of the time-critical nature of the procedure.

11.2 Second Procedure

The second procedure is a modification of the first procedure in that the pellet(s) of carbon dioxide is wrapped in a small piece of paper or other suitable material of relatively low thermal conductivity prior to being dropped through the filling hole into the propellant chamber. (The wrapping material may be soluble or insoluble in the acetone or other liquid solvent(s) employed). The paper acts as a thermal barrier which delays vaporisation of the cryogenically-cold carbon dioxide by contact with the relatively hot (ambient temperature) acetone, allowing more time in which to insert the plug into the filling hole and significantly reducing loss of carbon dioxide gas before plugging and sealing of the propellant chamber. The small piece of paper remains in the sealed propellant chamber but does not significantly or adversely affect the normal operation of the pressure pack dispenser.

11.3 Third Procedure

In the third procedure, the carbon dioxide is added to the acetone while the acetone is outside the pressure pack dispenser. Premature vaporisation of the carbon dioxide is obviated by pre-chilling the acetone to approximately the temperature of the subsequently added cryogenically-solidified and pelletised carbon dioxide. Specifically, in a batch process of producing the propellant system for a single standard-sized pressure pack dispenser, approximately 10 milliliters of liquid acetone was chilled to a temperature of about −80 degrees Centigrade (comfortably above the freezing point of commercial-purity acetone). A carbon dioxide pellet with a nominal weight of 1.5 grammes was then added to the pre-chilled acetone. The thermal interaction of the acetone with the carbon dioxide was minimal since both substances had approximately equal temperatures. Moreover, the absorption of a small quantity of carbon dioxide into acetone at a temperature of −80 degrees Centigrade would take place instantly. The resultant carbon dioxide/acetone composite was then transferred into the propellant chamber of the pressure pack dispenser before significant warming took place, and the propellant chamber was promptly sealed. When the temperature of the dispenser stabilised at ambient indoor temperature ("room temperature"), the dispenser was fully pressurised within acceptable tolerances for initial pressurisation, and ready for use.

11.4 Fourth Procedure

The fourth procedure is similar to the third procedure in pre-chilling the acetone to a predetermined temperature, but differs in respect of adding gaseous carbon dioxide to the pre-chilled acetone. It has been established that −55 degrees Centigrade is the exact temperature at which the acetone should be maintained while gaseous carbon dioxide is bubbled through the acetone, in order for the acetone to absorb the correct proportion of carbon dioxide for subsequent use as a propellant in a standard piston-barrier pressure pack dispenser as manufactured and sold by Rocep-Lusol Limited. Absorption of carbon dioxide in acetone at that temperature is quickly achieved. The liquid mixture of carbon dioxide and acetone at −55 degrees Centigrade is then transferred directly into the pressure pack dispenser. Only when the temperature increases from −55 degrees Centigrade does carbon dioxide start to boil off. This temperature control is therefore a way of accurately metering the volume of carbon dioxide required for a given volume of acetone.

While certain modifications and variations have been described above, the invention is not restricted thereto, and other modifications and variations can be adopted without departing from the scope of the invention as defined in the appended Claims.

We claim:

1. A gas storage and dispensing system for the substantially reversible storage of a gas, said gas storage and dispensing system comprising a polymeric material which sorbs increasing quantities of fluid in increasing ambient pressure and desorbs previously sorbed gas with decreasing in ambient pressure, the polymeric material having molecular microvoids occupiable by a fluid to cause the polymeric material to form a reversible sorption gas storage system.

2. A gas storage and dispensing system according to claim 1, wherein the fluid is the gas, and the reversible sorption gas storage system formed is a two-phase gas/-solid system.

3. A gas storage and dispensing system according to claim 1, wherein the fluid is a liquid which is a solvent of the gas but is insoluble of the polymeric material, and the reversible gas storage system formed is a three-phase gas/liquid/solid system.

4. A gas storage and dispensing system as claimed in claim 3 wherein the liquid solvent of the gas comprises a polar solvent.

5. A gas storage and dispensing system as claimed in claim 2 wherein the polymeric material is a cross-linked polymer which tends to swell without substantial dissolution when in contact with a liquid which is or would be a solvent of a chemically equivalent or similar linear polymer.

6. A gas storage and dispensing system as claimed in claim 5 herein the polymeric material is treated with a swelling promoter to enhance the gas sorption capacity of the polymeric material.

7. A gas storage and dispensing system as claimed in claim 3 wherein the polymeric material is a cross-linked polymer which tends to swell without substantial dissolution when in contact with a liquid which is or would be a solvent of a chemically equivalent or similar linear polymer.

8. A gas storage and dispensing system as claimed in claim 6 wherein the polymeric material is a cross-linked polymer which tends to swell without substantial dissolution when in contact with a liquid which is or would be a solvent of a chemically equivalent or similar linear polymer.

9. A gas storage and dispensing system as claimed in claim 2, wherein said polymeric material is a hydrogel which comprises polymerised moieties derived from (i) at least one polymerisable unsaturated cyclic ether or thioether, and (ii) at least one hydrophilic homopolymer or copolymer.

10. A gas storage and dispensing systems as claimed in claim 3, wherein said polymeric material is a hydrogel which comprises polymerised moieties derived from (i) at least one polymerisable unsaturated cyclic ether or thioether, and (ii) at least one hydrophillic homopolymer or copolymer.

11. A gas storage and dispensing system for the substantially reversible storage of gas, said gas storage and dispensing system comprising a liquid solvent for the gas, the gas being substantially soluble in said liquid solvent to cause the liquid solvent to form a two-phase gas/liquid reversible sorption gas storage system which will tend to sorb increasing quantities of gas in increasing ambient gas pressure, and tend to desorb previously sorbed gas with decreases in ambient gas pressure.

12. A gas storage and dispensing system as claimed in claim 11 wherein said liquid solvent is admixed with a gas sorption promoter.

13. A gas storage and dispensing system as claimed in claim 11 wherein the liquid solvent is acetone.

14. A gas storage and dispensing system as claimed in claim 2 or claim 3 or claim 10, wherein said gas is at least one gas selected from the graph comprising elemental gases, molecular gases and gaseous compounds and said gas is substantially gaseous when desorbed such that the potential energy of the desorbed gas is thermodynamically convertible to useful mechanical work as a propellant gas.

15. A gas storage and dispensing system as claimed in claim 14 wherein said propellant gas comprises carbon dioxide.

16. A pressure pack dispenser for dispensing a product therefrom by means of the pressure of a propellant gas within the dispenser, said pressure pack dispenser comprising a pressurisable container having a valve for releasing the product from the container, said container enclosing a gas storage and dispensing system as claimed in claim 14, said gas storage and dispensing system providing a source of pressurised propellant gas for dispensing the product from the pressure pack dispenser.

17. A pressure pack dispenser as claimed in claim 16 wherein said dispenser is a non-barrier dispenser in which the propellant gas is permitted to come into direct contact with the product to be dispensed.

18. A pressure pack dispenser as claimed in claim 16 wherein said dispenser is a barrier dispenser in which a substantially gas-impermeable barrier is located between the product to be dispensed and the gas storage and dispensing system, the barrier being such as to transmit the pressure of the propellant gas to the product while substantially preventing direct contact between the product and the gas storage and dispensing system.

19. A pressure pack dispenser as claimed in claim 18 wherein the barrier comprises a flexible bag enclosing the product to be dispensed and sealed to the pressurisable container at or adjacent to the valve.

20. A pressure pack dispenser as claimed in claim 18 wherein said barrier comprises a piston or piston-form arrangement slidingly sealed to an internal surface of the pressurisable container with the product contained between one side of the piston or piston-form arrangement and the valve, the gas storage and dispensing system being housed between the other side of the piston or piston-form arrangement and the non-valve end of the pressurisable container such that the pressure of the propellant gas will tend, in use of the dispenser, to drive the piston or piston-form arrangement towards the valve end of the pressurisable container so as to tend to discharge the product through the valve.

21. A pressure pack dispenser as claimed in claim 20 wherein said piston or piston-form arrangement is a composite piston incorporating a deformable sealant material disposed to limit penetration of the propellant gas into the dispensible product.

22. A pressure pack dispenser as claimed in claim 16 wherein said dispenser comprises a semi-permeable barrier enclosing the gas storage and dispensing system, the semi-permeable barrier being permeable to propellant gas but substantially impermeable to the non-gaseous component or components of the gas storage and dispensing system whereby the semi-permeable barrier passes the propellant gas to pressurise the product by direct contact while maintaining the non-gaseous component or components of the gas storage and dispensing system out of direct contact with the product.

23. A pressure pack dispenser as claimed in claim 22 wherein said semi-permeable barrier is in the form of a bag or envelope sealed in liquid-tight manner around the components of the gas storage and dispensing system.

24. A pressurising procedure for pressurising a pressure pack dispenser, said dispenser being as claimed in claim 20, said pressurising procedure comprising the steps of inserting a substantially predetermined quantity of the non-gaseous component or components of the gas storage and dispensing system into the pressurisable container on the side of the piston or piston-form arrangement not occupied in use by the product to be dispensed, subsequently or substantially simultaneously adding a substantially predetermined amount of a substantially non-gaseous form of the propellant gas to the same part of the pressurisable container as is occupied by said non-gaseous component or components, and sealing the part of the pressurisable container occupied by the gaseous and non-gaseous components of the propellant gas storage and dispensing system.

25. A pressurising procedure as claimed in claim 24 wherein the substantially non-gaseous form of the propellant gas comprises the propellant gas cryogenically cooled to a temperature at which the propellant gas is liquefied or solidified.

26. A pressurising procedure as claimed in claim 25 and wherein the propellant gas is carbon dioxide, said substantially non-gaseous form of the propellant gas being solid carbon dioxide.

27. A pressurising procedure for pressurising a pressure pack dispenser, said dispenser being as claimed in claim 20 and wherein the gas storage and dispensing system comprises a liquid solvent for the gas, said gas being a propellant gas, the propellant gas being substantially soluble in said liquid solvent to cause the liquid solvent to form a two-phase propellant-gas/liquid-solvent reversible sorption propellant gas storage system, said pressurising procedure comprising the steps of cryogenically chilling the liquid solvent without freezing the solvent, admixing the propellant gas with the pre-chilled liquid solvent to form a propellant/solvent system containing a predetermined proportion of sorbed propellant gas, inserting a substantially predetermined quantity of said propellant/solvent system into the pressurisable container on the side of the piston or piston-form arrangement not occupied in use by the product to be dispensed, said insertion being carried out prior to any substantial increase in the temperature of said propellant/solvent system, and sealing the part of the pressurisable container occupied by the propellant gas storage and dispensing system.

28. A pressurising procedure as claimed in claim 27 wherein the propellant gas is admixed with the pre-chilled liquid solvent by bubbling the propellant in gaseous form through the pre-chilled liquid solvent while the solvent is maintained at a predetermined temperature resulting in the solvent sorbing the predetermined proportion of propellant gas.

29. A pressurising procedure as claimed in claim 27 wherein the propellant gas is admixed with the pre-chilled liquid solvent by first cryogenically freezing the propellant gas to a non-gaseous form and mixing a predetermined quantity of the frozen propellant with a predetermined quantity of the pre-chilled liquid solvent.

* * * * *